(12) United States Patent
Zeller et al.

(10) Patent No.: US 7,191,336 B2
(45) Date of Patent: Mar. 13, 2007

(54) METHOD FOR EMBEDDING INFORMATION IN AN IMAGE

(75) Inventors: Claude Zeller, Monroe, CT (US); Robert A. Cordery, Danbury, CT (US); Donald G. Mackay, Roxbury, CT (US); William A. Brosseau, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 822 days.

(21) Appl. No.: 10/087,518

(22) Filed: Mar. 1, 2002

(65) Prior Publication Data

US 2003/0052178 A1 Mar. 20, 2003

Related U.S. Application Data

(60) Provisional application No. 60/283,565, filed on Apr. 13, 2001.

(51) Int. Cl.
*H04L 9/00* (2006.01)
*H04L 9/28* (2006.01)

(52) U.S. Cl. ...................................... 713/176
(58) Field of Classification Search ................ 713/176; 705/401, 400, 60
See application file for complete search history.

(56) References Cited

U.S. PATENT DOCUMENTS

| | | | |
|---|---|---|---|
| 5,635,694 A | 6/1997 | Tuhro | |
| 5,825,892 A | 10/1998 | Braudaway et al. | |
| 5,829,895 A | 11/1998 | Hayashi et al. | |
| 5,946,414 A * | 8/1999 | Cass et al. | 382/183 |
| 6,102,592 A | 8/2000 | Herbert | |
| 6,201,879 B1* | 3/2001 | Bender et al. | 382/100 |
| 6,317,115 B1 | 11/2001 | Yokomizo | |
| 6,332,194 B1 | 12/2001 | Bloom et al. | |
| 6,359,998 B1 | 3/2002 | Cookley | |
| 6,415,983 B1 | 7/2002 | Ulvr et al. | |
| 6,611,598 B1 | 8/2003 | Hayosh | |
| 6,636,615 B1* | 10/2003 | Rhoads et al. | 382/100 |
| 6,768,807 B1* | 7/2004 | Muratani | 382/100 |
| 6,882,442 B2* | 4/2005 | Roberts | 370/401 |
| 2001/0022848 A1* | 9/2001 | Rhoads | 382/100 |
| 2003/0028497 A1* | 2/2003 | Leon | 705/408 |
| 2004/0190751 A1 | 9/2004 | Rhoads et al. | |
| 2004/0264735 A1* | 12/2004 | Rhoads | 382/100 |

* cited by examiner

*Primary Examiner*—Nasser Moazzami
*Assistant Examiner*—Eleni Shiferaw
(74) *Attorney, Agent, or Firm*—Ronald Reichman; Angelo N. Chaclas (57) ABSTRACT

A method for producing a background image representing data. The background image is created by; producing a first encoding of data into a first binary array; producing a second encoding of the data into a second binary array; representing the first binary array as a first set of modules of a first size of n×n pixels wherein each pixel in the module is either white or black and every pixel in the module is identical to every other picture in the module on nodes of a first lattice, representing the second binary array as a first set of modules of a second size, of m×m wherein each pixel in the module is either white or black and every pixel in the module is identical to every other pixel in the module, which is smaller than the first size on nodes of a second lattice, combining the first and second sets of modules; and printing the first and second sets of modules.

15 Claims, 7 Drawing Sheets

METHOD FOR EMBEDDING INFORMATION IN AN IMAGE

CROSS REFERENCE TO RELATED APPLICATIONS

Reference is made to commonly assigned copending patent application Ser. No. 10/087,492 filed herewith entitled "Method For Reading Information That Has Been Embedded In An Image" in the names of Robert A. Cordery, Claude Zeller, Donald G. Mackay and William A. Brosseau; and Ser. No. 10/087,314 filed herewith entitled "Method For Utilizing A Fragile Watermark For Enhanced Security" in the names of Claude Zeller, Donald G. Mackay, William Kilmartin, William A. Brosseau, James Euchner and Robert A. Cordery (Ser. No. 10/087,314 claims the benefit of the filing date of U.S. Provisional Application No. 60/283,565 filed Apr. 13, 2001, which is owned by the assignee of the present Application).

FIELD OF THE INVENTION

The subject invention relates to a method for printing images that contain certain information and, more particularly, to a method that detects when the printed images containing certain information are copied.

BACKGROUND OF THE INVENTION

Images such as postal indicia have been printed by postage meters to evidence that the appropriate postage has been affixed to the mailpiece. A typical postal indicia includes fixed elements such as city name, state, a graphic, meter serial number, etc., and variable information such as date, postage amount, an encrypted number, etc. Postal Indicia have been printed by flat bed printers and rotary printers without encryption and ink jet printers with encryption. The improvement of photocopying, printing and scanning equipment have made it easier to commit fraud by copying postal indicia.

Currently, ticketing companies are giving purchasers the option of printing their electronic tickets at home, using ordinary paper, a personal computer printer and an Internet connection. One of the problems in allowing people to print tickets at home is how to ensure that the tickets are not counterfeited. One of the solutions suggested to solve the foregoing problem is to print an encrypted bar code on the ticket. Unfortunately, a printed ticket on ordinary paper with an encrypted bar code can be photocopied, and the seller of the ticket will be unable to distinguish between the original, genuine ticket and the photocopied ticket.

SUMMARY OF THE INVENTION

This invention overcomes the disadvantages of the prior art by providing a method that makes it more difficult to copy images. The invention provides a method that detects when an image is copied or scanned to reduce the production of fraudulent images. Information in the form of a plurality of numbers and/or characters (in a normal or encrypted form) that represents some fact, i.e., date that an indicia was affixed to a mail piece, zip code, etc., is going to be embedded in an image in a manner that the embedded information will change in appearance when the image is scanned or photocopied.

The foregoing is accomplished by converting the plurality of numbers into a two-dimensional bar code that is repeated m times in the horizontal direction and n times in the vertical direction in order to produce redundancy so that the two-dimensional bar code will be easier to recover. The two-dimensional bar codes are then filtered by a spreading algorithm that scrambles the information represented by the two-dimensional bar code. Each scrambled two-dimensional bar code will be the same size as the two-dimensional bar code that it replaces. Then each scrambled two-dimensional bar code will be split into two equal parts, i.e., a first part and a second part. Each first part and each second part will contain an upper portion and a lower portion. The upper portion of the first part and the lower portion of the second part will be the same as the respective upper and lower parts of the scrambled two-dimensional bar code. The lower portion of the first part and the upper portion of the second part will be white or empty space. Spread spectrum-like techniques will then be applied to the first part and second part to further hide the information in the first and second parts and to make it easier to recover the information in the first and second parts. Then the plurality of first and second parts will be expanded over the entire image that is going to be printed. At each location in which information from the plurality of first parts is going to be printed, the printed information will be a printed pixel of a specified dimension, i.e., 2×2 pixels. At each location in which information from the plurality of second parts is going to be printed, the printed information will be a printed pixel of a specified dimension that differs from the pixels printed in the first parts, i.e., 3×3 pixels. The pixels of the first part and the pixels of the second part do not overlap. The plurality of first and second parts will then be printed over the image to produce an image containing hidden information that is difficult to copy. When the image and plurality of first and second parts are scanned and printed and/or photocopied, the printed pixels of specified dimensions in the first and second parts will be distorted in the bit map. In addition, the scanned pixels will not align perfectly with the printed pixels. When the scanned image is converted back to a bit map, this usually increases the percentage of black pixels. Thus, the combination of optical effects, digitations effects and ink spread increase the size of the black areas. The change in size of the printed pixels of specified dimensions in the first and second parts may be observable by the human eye and/or a scanner. Thus, one will be able to determine when an image is copied.

DETAILED DESCRIPTION OF PREFERRED EMBODIMENTS OF THE INVENTION

Figure 1:
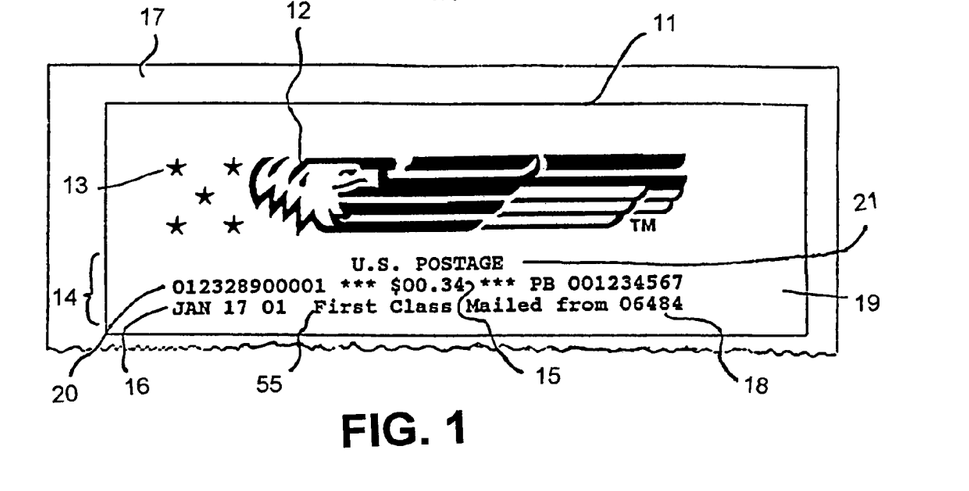
FIG. 1 is a drawing of a postal indicia.

Referring now to the drawings in detail, and more particularly to FIG. 1, the reference character 11 represents a postal indicia. Postal indicia 11 includes graphic material in the form of an eagle 12 and stars 13 and alphanumeric material 14. Indicia 11 also contains a dollar amount 15; the date 16 that postal indicia 11 was affixed to mail piece 17; the zip code where mail piece 17 was mailed from 18; the postal meter serial number 19; a security code 20; the class of mail 55; and the country 21.

Figure 2:
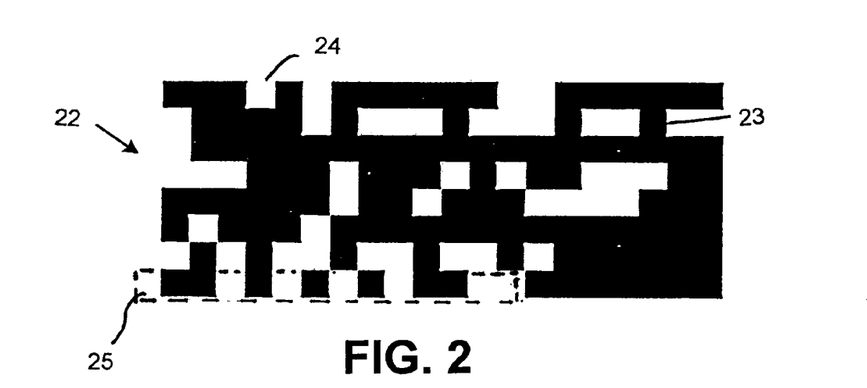
FIG. 2 is a drawing of a two-dimensional bar code that represents in coded form the information contained in material 14 and other information.

FIG. 2 is a drawing of a two-dimensional bar code 22 that represents in coded form the information contained in material 14 and other information. Bar code 22 comprises a plurality of black modules 23 and white modules 24. Black modules 23 represent a "zero", and white modules 24 represent a "one". Portion 25 of bar code 22 represents the zip code 18 of FIG. 1 with the least significant bit on the left.

Figure 3:
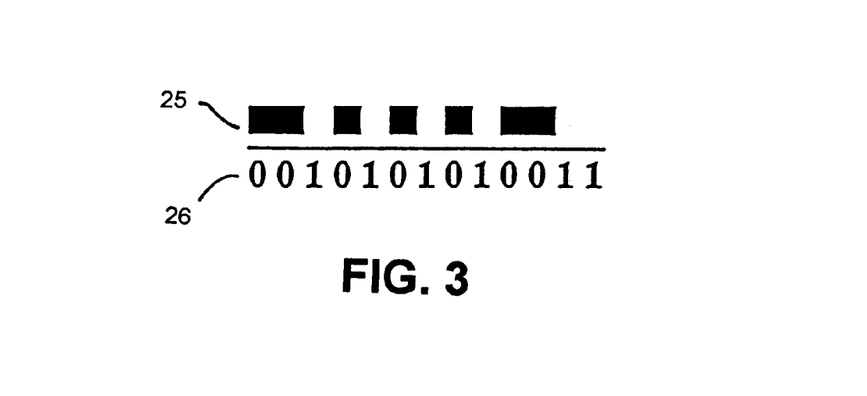
FIG. 3 is a drawing of portion 25 of bar code 22.

FIG. 3 is a drawing of portion 25 of bar code 22. The binary representation of portion 25, i.e., zip code 18, is shown by a plurality of ones and zeros 26.

Figure 4:
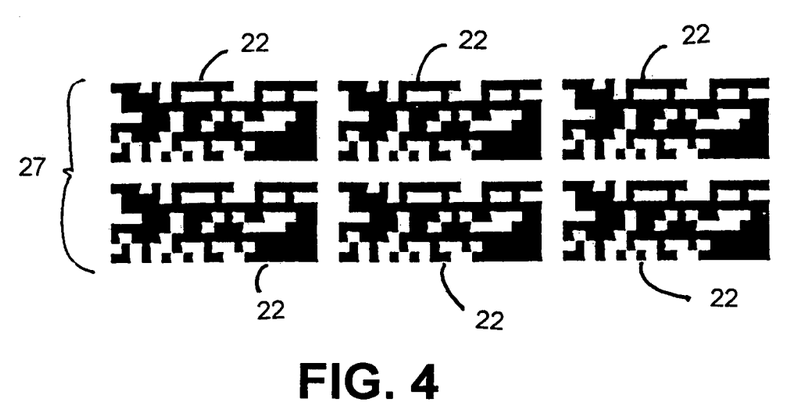
FIG. 4 is a drawing of image 27 consisting of bar code 22 repeated m times in the horizontal direction and n times in the vertical direction.

FIG. 4 is a drawing of image 27 consisting of bar code 22 repeated m times in the horizontal direction and n times in the vertical direction, where m=3 and n=2. Thus, redundancy is applied by repeating the image of bar code 22 three times in the horizontal direction and two times in the vertical direction.

Figure 5:
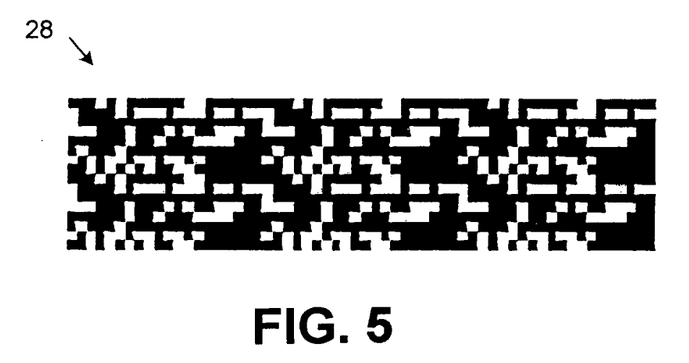
FIG. 5 is a drawing showing the condensing of the six bar codes 22 into one bar code image 28.

FIG. 5 is a drawing showing the condensing of the six bar codes 22 into one bar code image 28.

Figure 6:
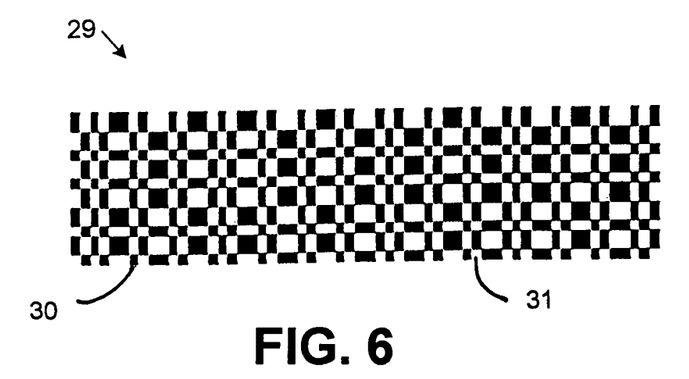
FIG. 6 is a drawing of a mathematical filter 29 that has the same dimensions as bar code image 28 of FIG. 5.

FIG. 6 is a drawing of a mathematical filter 29 that has the same dimensions as bar code image 28 of FIG. 5, i.e., a length of 60 pixels and a width of 16 pixels. Filter 29 may be any arrangement of black pixels 30 and white pixels 31 as long as filter 29 contains the same number of black pixels 30 having a value of "0", and white pixels 31 having a value of "1". Filter 29 may be a pseudo random stream of bits such as the output of a cryptographic algorithm like the Digital Encryption Standard (DES). Alternatively, filter 29 may be an exclusive—or of a function of the X coordinate and a function of the Y coordinate as shown in FIG. 6. Filter 29 causes a pixel by pixel exclusive—or reversal—process when it filters an image. Thus, when the pixel of the filter is white, there will be a reversal between the image and the calculated filter image; and when the pixel of the filter is black, there will be no change between the image and the calculated filter image. The following chart shows the calculated filter value for different color image pixels and different color filter pixels.

| COLOR OF PIXEL IMAGE | COLOR OF PIXEL IN FILTER | CALCULATED FILTER IMAGE |
| --- | --- | --- |
| White = 1 | White = 1 | Black = 0 |
| Black = 0 | White = 1 | White = 1 |
| White = 1 | Black = 0 | White = 1 |
| Black = 0 | Black = 0 | Black = 0 |

The filter 29 shown in FIG. 6 is applied to the bar code image 28 shown in FIG. 5 to make the redundant bar code image 28 information invisible. The filter algorithm implementation is a pixel by pixel exclusive—or operation between the image and the filter.

Figure 7:
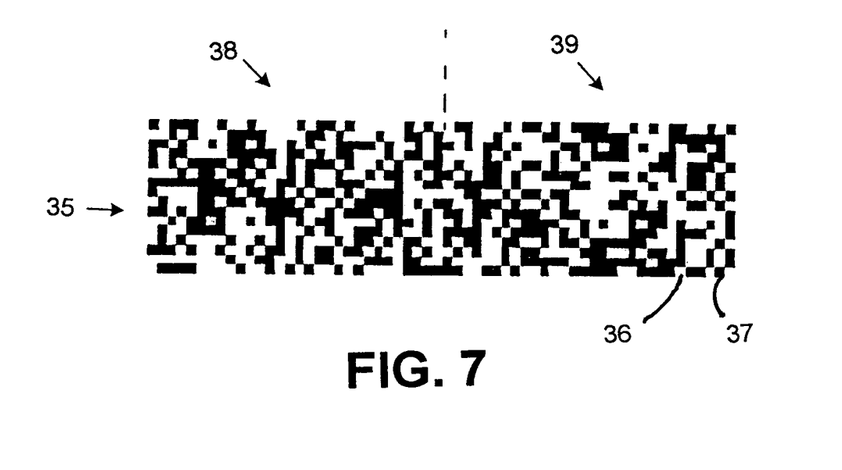
FIG. 7 is the resulting image 35 of bar code image 28 (FIG. 5) filtered by filter 29 (FIG. 6).

FIG. 7 is the resulting image 35 of bar code image 28 (FIG. 5) filtered by filter 29 (FIG. 6). Resulting image 35 is a matrix of sixty horizontal pixels by sixteen vertical pixels that include white pixels 36 and black pixels 37. Image 35 has a left half 38 and a right half 39. The number of pixels in half 38 equals the number of pixels in right half 39. If one would compare bar code image 28 with resulting image 35, one would observe that bar code image 28 does not correlate with resulting image 35. One would also note that the periodic structure of bar code image 28 is no longer visible in resulting image 35.

Figure 8:
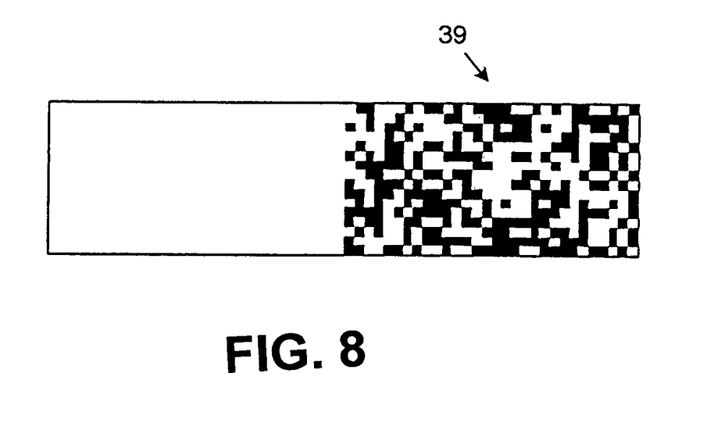
FIG. 8 is a drawing of right half 39 of FIG. 7.

FIG. 8 is a drawing of right half 39 of FIG. 7.

Figure 9:
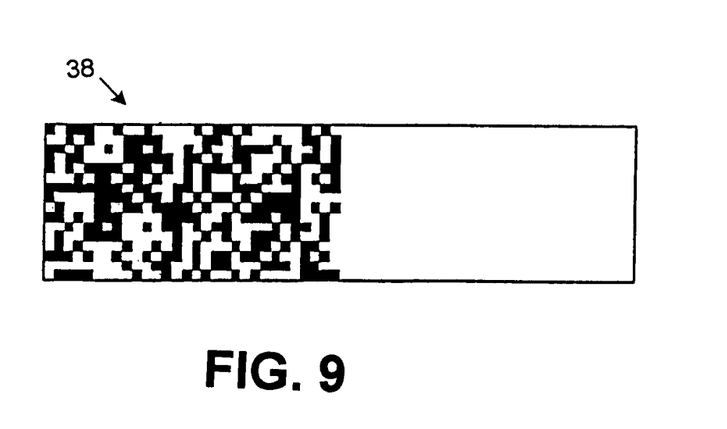
FIG. 9 is a drawing of left half 38 of FIG. 7.

FIG. 9 is a drawing of left half 38 of FIG. 7.

Figure 9A:
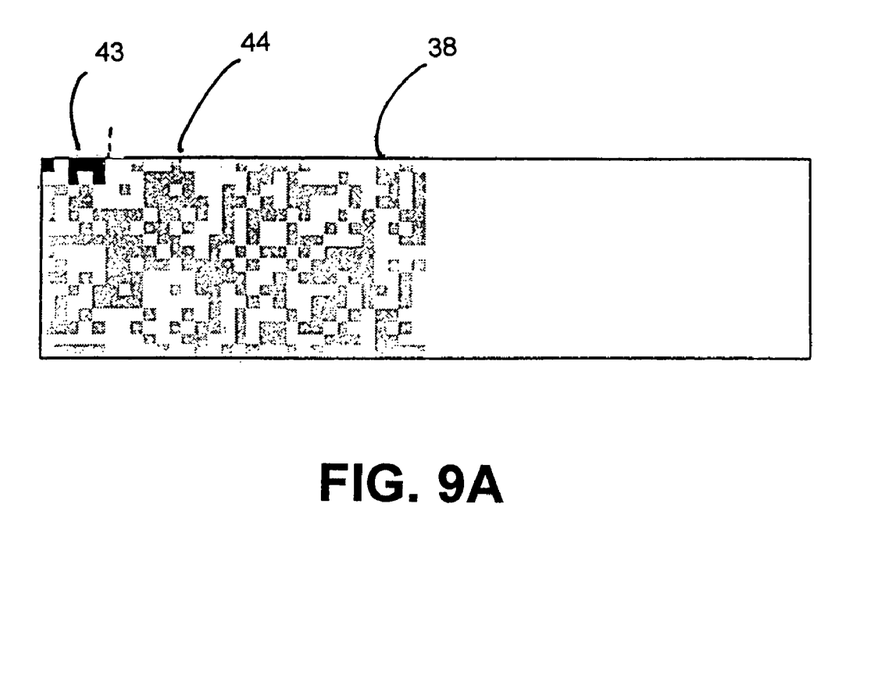
FIG. 9A is a drawing of left half 38 of FIG. 7 divided into section 43 and section 44.

FIG. 9A is a drawing of left half 38 of FIG. 7 divided into section 43 and section 44. Section 43 is shown having black and white pixels. Section 44 is shown having gray and white pixels.

Figure 9B:
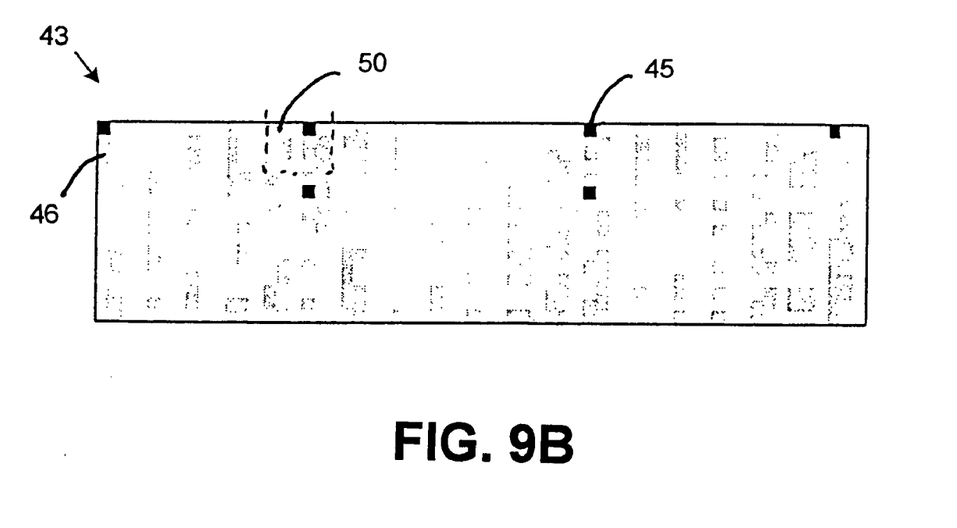
FIG. 9B is a drawing showing the spreading algorithm applied to section 43 of FIG. 9A.

FIG. 9B is a drawing showing the spreading algorithm applied to section 43 of FIG. 9A. The spreading algorithm will be described in the description of FIG. 10. Black pixels are shown at 45, and white pixels are shown at 46. Section 43 has a region 50.

Figure 10:
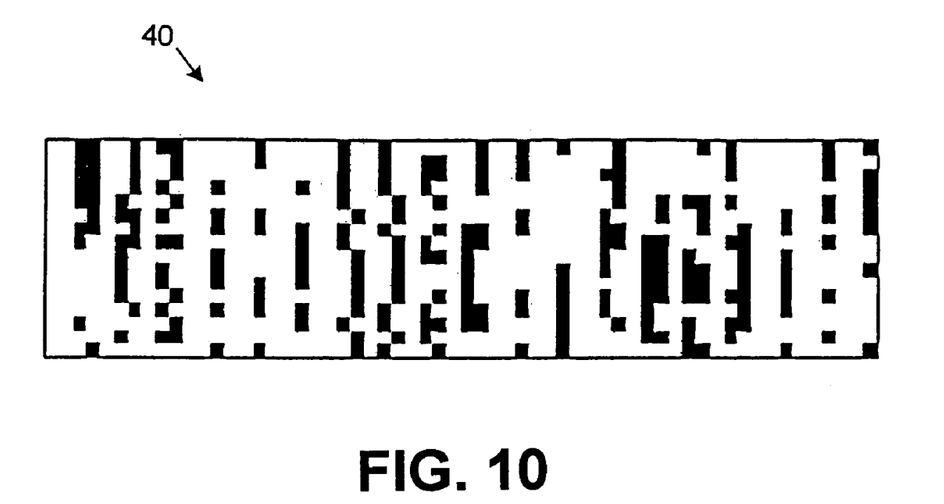
FIG. 10 is a drawing of an image 40 when a spreading algorithm is applied to left half 38.

FIG. 10 is a drawing of an image 40 when a spread spectrum-like algorithm is applied to left half 38. The spreading algorithm is used to increase the hiding capability and optimal recovery of the information hidden in image 40. The spreading algorithm disperses the information, i.e., white pixels and black pixels, in a manner that neighboring pixels in image 38 will not be close together in image 40. In image processing a spreading algorithm essentially transforms an image into another image by randomizing the rows and columns indexes.

The following is an example of a spreading algorithm:

$$FIN(NK, KK, k) := \mod\left[KK \cdot \mod\left(k, \operatorname{ceil}\left(\frac{NK}{KK}\right)\right) + \operatorname{floor}\left[\frac{k}{\operatorname{ceil}\left(\frac{NK}{KK}\right)}\right] \cdot \mod\left(KK \cdot \operatorname{ceil}\left(\frac{NK}{KK}\right), NK\right), NK\right]$$

-continued $$INX(NK) := \begin{vmatrix} \text{for } KK \in 1 \ldots NK-1 \\ \quad \text{for } k \in 0 \ldots NK-1 \\ \quad \quad IN_{k,KK} \leftarrow FIN(NK, KK, k) \\ \quad \quad K_k \leftarrow k \\ \quad MN_{KK} \leftarrow \Phi\left(2 \cdot \frac{\text{mean}(IN^{<KK>})}{NK-1} - 1\right) \\ \quad COR_{KK} \leftarrow |\text{corr}(IN^{<KK>}, K)| \cdot MN_{KK} + 1 - MN_{KK} \\ \quad COR_0 \leftarrow 1 \\ \quad MIN \leftarrow \min(COR) \\ \quad SKK \leftarrow \overrightarrow{[(\Phi(MIN - COR)) \cdot K]} \\ \quad KKO \leftarrow \max(SKK) \\ \quad \text{for } k \in 0 \ldots NK-1 \\ \quad \quad INDX_k \leftarrow FIN(NK, KKO, k) \\ \quad INDX \end{vmatrix}$$

NK is the size of the row or column, and k is the index of the row or column in the original image.

FIN(NK,KK,k) returns a permutation of the index k. The value of KK is chosen to minimize the correlation between the index and the permuted index.

The routine INX(NK) returns the selected permutation INDX.

$INDX_k$ is the chosen permuted index in the spread image.

Figure 11:
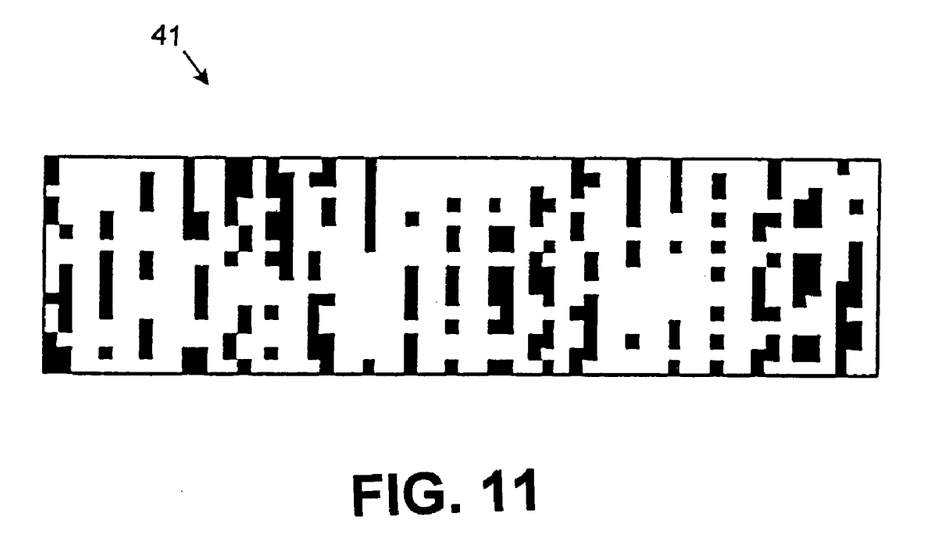
FIG. 11 is a drawing of an image 41 when a spread spectrum-like algorithm is applied to right half 9.

FIG. 11 is a drawing of an image 41 when a spreading algorithm is applied to right half 39. The spreading algorithm is used to increase the hiding capability and optimal recovery of the information hidden in image 41. The spreading algorithm disperses the information, i.e. white pixels and black pixels in a manner that the neighboring pixels in image 39 will not be close together in image 41. In image processing, a spreading algorithm essentially transforms an image into another image by randomizing the rows and columns indexes. An example of a spreading algorithm is shown in the description of FIG. 10.

Figure 12:
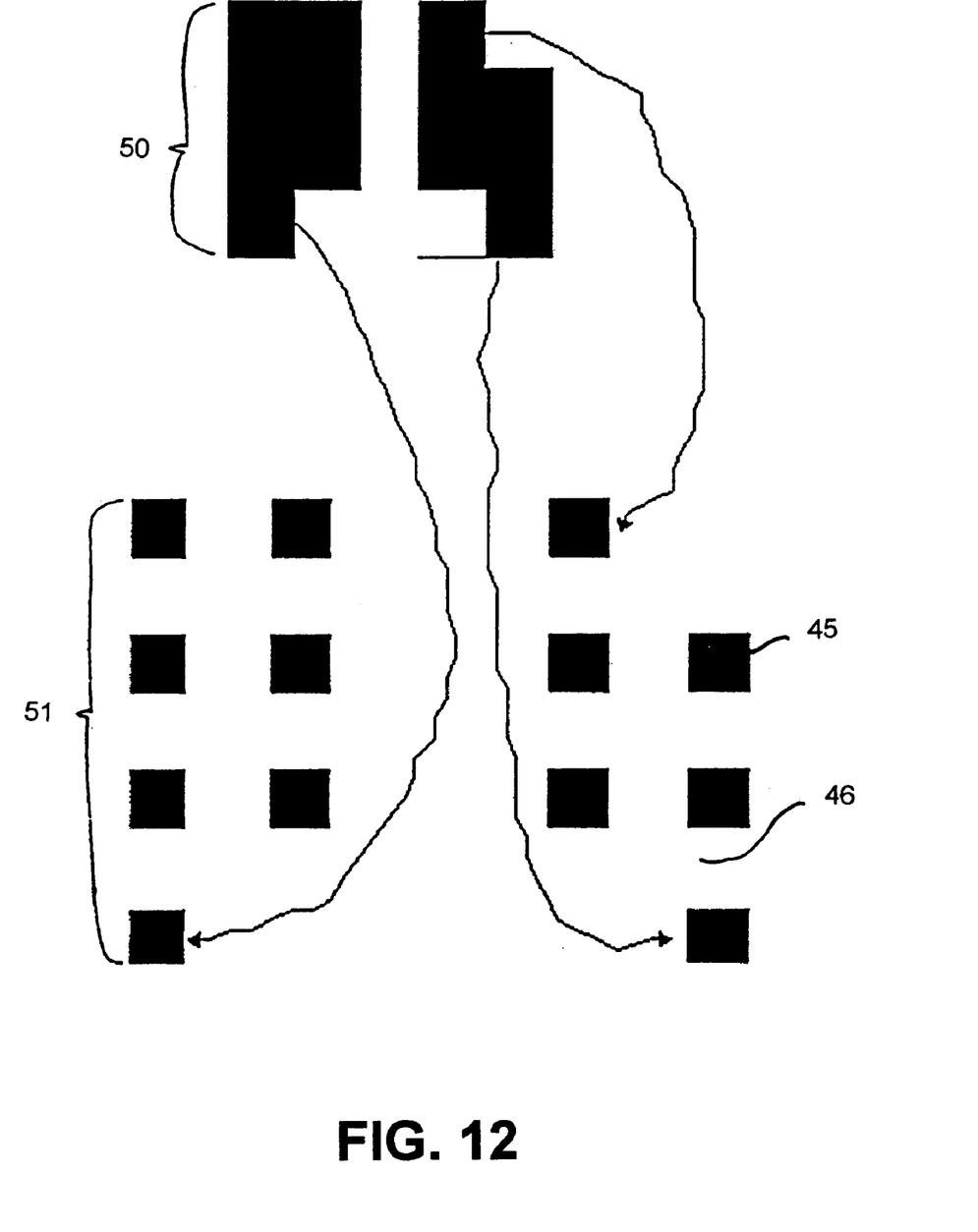
FIG. 12 shows a detailed step of the expansion process.

FIG. 12 is a drawing of an enlarged view of region 50 of section 43 and region 50 expanded into region 51. Black pixels are shown at 45 and white pixels are shown at 46. One of the purposes of expanding an image is to control the lightness of the background and to provide a grid to enable a low resolution reading.

Figure 13:
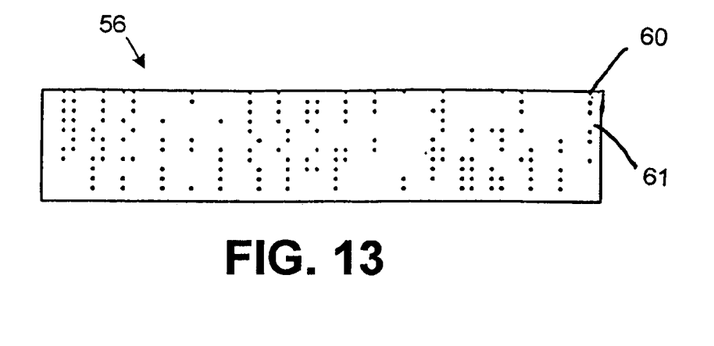
FIG. 13 is a drawing of image 40 expanded to image 56.

FIG. 13 is a drawing of image 40 expanded to image 56. Black pixels are shown at 60, and white pixels are shown at 61. A cluster of 2×2 dots 60 is formed from one black pixel in image 56. No cluster is printed at location 61 to represent a white pixel in image 56.

Figure 14:
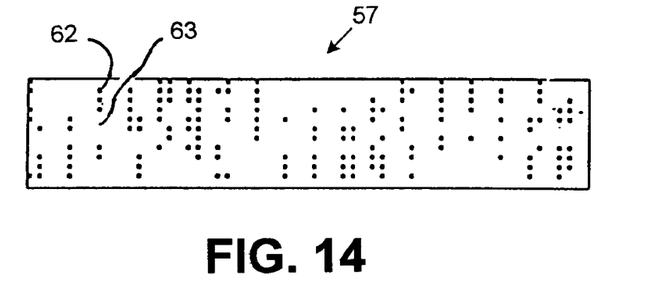
FIG. 14 is a drawing of image 41 expanded to image 57.

FIG. 14 is a drawing of image 41 expanded to image 57. Black pixels are shown at 62, and white pixels are shown at 63. A cluster of 3×3 dots 62 is formed from one black pixel in image 57. No cluster is printed at location 63 to represent a white pixel in image 57. It would be obvious to one skilled in the art that many differently sized and shaped clusters may be used.

Figure 15:
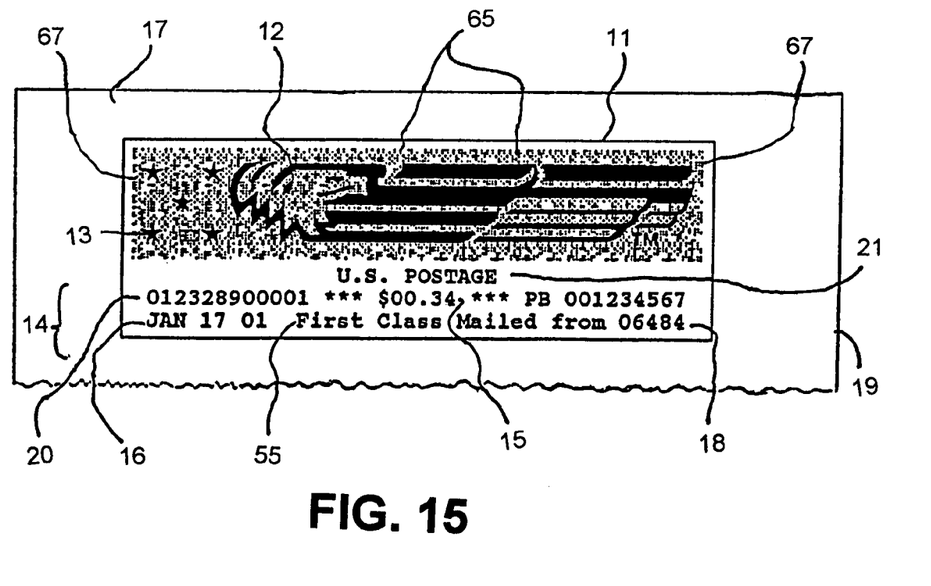
FIG. 15 is a drawing of images 40 and 41 embedded in the graphical material portion of indicia 11 of FIG. 1.

FIG. 15 is a drawing of images 40 and 41 embedded in the graphical material portion of indicia 11 of FIG. 1. Image 40 black pixels are shown at 67 and image 41 black pixels are shown at 65. The manner in which images 40 and 41 change in appearance when they are photocopied, is described in FIG. 17 of copending patent application Docket No. F-285 filed herewith entitled "Method For Reading Information That Has Been Embedded In An image" herein incorporated by reference.

The above specification describes a new and improved method for embedding information in an image. It is realized that the above description may indicate to those skilled in the art additional ways in which the principles of this invention may be used without departing from the spirit. Therefore, it is intended that this invention be limited only by the scope of the appended claims.

What is claimed is:

1. A computer implemented method of producing a background image representing data comprising the steps of:
   producing a first encoding of the data into a first binary array;
   producing a second encoding of the data into a second binary array;
   representing the first binary array as a first set of modules of a first size of n×n pixels wherein each pixel is either white or black and every pixel in the module is identical to every other pixel in the module on nodes of a first lattice;
   representing the second binary array as a second set of modules of a second size of m×m wherein each pixel is either white or block and every pixel in the module is identical to every other pixel in the module, which is smaller than the first size on nodes of a second lattice;
   combining the first and second sets of modules and storing the combined result in a memory;
   printing the first and second sets of modules on a printing medium;
   superimposing graphic material on the modules before printing; and
   wherein the graphic material is an indicia.

2. The method claimed in claim 1, wherein the graphic material is a postal indicia.

3. The method claimed in claim 1, wherein the modules on the first lattice and the modules on the second lattice do not overlap.

4. A computer implemented method for producing a composite image comprising the steps of:
   producing a first image and a second image that embeds information in the first image;
   representing information contained in the second image by a two-dimensional bar code;
   filtering the two-dimensional bar code with a spreading algorithm that scrambles the information represented by the two-dimensional bar code;
   splitting the bar code into an equal first part and an equal second part, wherein each first part and each second part will contain an upper portion and a lower portion such that the lower portion of the first part and the upper portion of the second part will be white or empty space;
   applying a spreading algorithm that is stored in a memory to the first part and second part to scramble the information to further hide the information in the first and second parts in a manner that the spreading algorithm will move pixels in the first image and the second image so that the moved pixels will not be close together;
   expanding the first and second parts over the entire image that is going to be printed;
   printing the first and second parts over the first image to produce an image containing hidden information on a printing medium; and
   wherein the first image is an indicia.

5. The method claimed in claim 4, wherein the first image is a postal indicia.

6. The method claimed in claim 4, wherein:
- at each location in which information from the first parts is going to be printed, the printed information will be a printed pixel of a specified dimension, and
- at each location in which information from the plurality of second parts is going to be printed, the printed information will be a printed pixel of a specified dimension that differs from the pixels printed in the first parts.

7. The method claimed in claim 4, wherein when the first and second images are scanned and printed, the printed pixels of specified dimensions in the first and second parts will become larger.

8. The method claimed in claim 7, wherein the change in size of the printed pixels of specified dimensions in the first and second parts is detectable by a scanner.

9. The method claimed in claim 7, wherein the change in size of the printed pixels of specified dimensions in the first and second parts is detectable by the unaided human eye.

10. The method claimed in claim 4, further including the steps of:
- photocopying the first and second images; and
- noticing a change in appearance of the second image.

11. The method claimed in claim 4, further including the steps of:
- scanning the first and second images; and
- noticing a change in appearance of the second image.

12. The method claimed in claim 4, wherein when the first and second images are photocopied, the printed pixels of specified dimensions in the first and second parts will become larger.

13. The method claimed in claim 12, wherein the change in size of the printed pixels of specified dimensions in the first and second parts is detectable by the unaided human eye.

14. The method claimed in claim 12, wherein the change in size of the printed pixels of specified dimensions in the first and second parts is detectable by the scanner.

15. The method claimed in claim 4, wherein the first image will not change in appearance when the first image is scanned or photocopied.

* * * * *